United States Patent

[11] 3,551,644

[72] Inventors Yoshiaki Sano
Hyogo-Ken;
Kaoru Yamazaki; Eisuke Kurokawa;
Hiromu Sasaki; Shigeru Hayakawa, Osaka-Fu, Japan
[21] Appl. No. 732,667
[22] Filed May 28, 1968
[45] Patented Dec. 29, 1970
[73] Assignee Matsushita Electric Industrial Co., Ltd.
Kadoma, Osaka, Japan

[54] AUTOMATIC ELECTRIC RICE COOKER
4 Claims, 9 Drawing Figs.
[52] U.S. Cl. ................................................ 219/441,
219/433, 219/521; 99/331; 338/22
[51] Int. Cl. ..................................................... F27d 11/02,
A47j 27/62
[50] Field of Search ............................................. 219/441,
442, 494, 521, 320, 433, 455, 552, 436, 400;
338/22; 337/53; 252/520, 521; 99/80, 403, 331

[56] References Cited
UNITED STATES PATENTS

| | | | |
|---|---|---|---|
| 2,365,615 | 12/1944 | Woodman | 219/441 |
| 2,722,595 | 11/1955 | Kolb | 219/320 |
| 2,765,391 | 10/1956 | Shroyer | 219/455 |
| 2,804,532 | 8/1957 | Lacy-Hulbert | 219/552X |
| 2,952,764 | 9/1960 | Minami | 219/441X |
| 3,044,968 | 7/1962 | Ichikawa | 338/22X |
| 3,231,522 | 1/1966 | Blodgett et al. | 252/521 |
| 3,280,304 | 10/1966 | Shinohara et al. | 219/441 |
| 3,067,311 | 12/1962 | Lacy-Hulbert | 219/552 |

Primary Examiner—Volodymyr Y. Mayewsky
Attorney—Wenderoth, Link & Ponack

ABSTRACT: An automatic electric rice cooker having a pot for containing the rice to be cooked and a body supporting said pot and having a heater circuit capable of quickly switching from a large current to a small current upon completion of the cooking of the rice. The small current keeps the cooked rice warm. The heater circuit comprises an alloy resistor and at least one resistor having a positive temperature coefficient of electrical resistance in series with the alloy resistor and thermally coupled with said pot.

INVENTORS
Y. SANO
K. YAMAZAKI
E. KUROKAWA
H. SASAKI
S. HAYAKAWA

BY *Wenderoth, Lind & Ponack*

ATTORNEYS

AUTOMATIC ELECTRIC RICE COOKER

This invention relates to a cooking device, and more particularly to an improved electrical cooking device such as an electric rice cooker.

There have been attempts in the electric appliance industry to provide electric appliances which can be actuated nickel-chromium These appliances have electrical relay contact members actuated by thermal sensitive properties of bimetal members or magnetic materials. However, an electric relay contact is liable to be oxidized by arcing and sometimes becomes corroded. These phenomena cause the operation of the electric relay contact to deteriorate.

In the operation of a rice cooker, it is desirable to first cook the rice and then to keep the cooked rice in an appropriate elevated temperature lower than the water-boiling temperature after cooking. Raw rice comprises mainly $\beta$-form starch which can not be digested in the stomach. The $\beta$-form starch must be converted into the $\alpha$-form to be digested. The conversion is ordinarily carried out by heating at 95 to 98° C. for about 20 minutes. It of course requires a shorter time at higher temperature. Raw rice should be boiled under the above mentioned conditions for cooking. From these considerations, an automatic rice cooker should be operated as follows.

Water and raw rice in an appropriate weight ratio are heated up and kept at the water boiling temperature for about 20 minutes. The amount of water should be a predetermined amount which will be boiled off during the boiling period except for the amount absorbed by the rice. At the bottom of pot of the rice cooker, the temperature is kept near the water-boiling temperature as long as water in a liquid condition is left. As soon as all the water is lost by boiling, the temperature at the bottom of the pot begins to rise. At this point, the rice is already cooked. It is still further desirable to continue heating the cooked rice at an appropriate temperature lower than the water-boiling temperature. This heating with a lower heating energy is useful for making the cooked rice more delicious and for preventing it from cooling. As mentioned above, the heating energy supplied to the rice cooker is required to be reduced stepwise at the time when the water has boiled off. In order to keep the cooked rice at this lower temperature, an auxiliary temperature-controlling device similar to those of the prior art has heretofore been required for controlling the temperature during the warming cycle.

The conventional electrical rice cooker has two bimetalic relays or one magnetic and one bimetalic relay. They are respectively used for switching off a large current for boiling rice and water, and for switching on a small current for keeping the cooked rice warm.

It is an object of the present invention to provide a device which is much simpler and cheaper than the prior art appliances.

The present invention achieves this object by providing an electrical rice cooker having a current switching action for switching the flow of current from a large value to a small one. In the present novel rice cooker, a resistor with a positive temperature coefficient of resistance hereinafter referred to as PTCR or PTC resistor is electrically connected in series with the heater winding which supplies a large amount of heating energy to the rice to be cooked. In the rice cooker of the present invention, the PTC resistor switches a large electric current to a small one at a predetermined temperature and after that, develops a small heating energy.

In order that the present invention may be readily carried into effect, it will be described in detail with reference to the accompanying drawings, in which.

Before proceeding to describe the actions of the rice cooker according to the present invention, attention should be directed to FIGS. 1, 2, 3, and 4.

Figure 1:
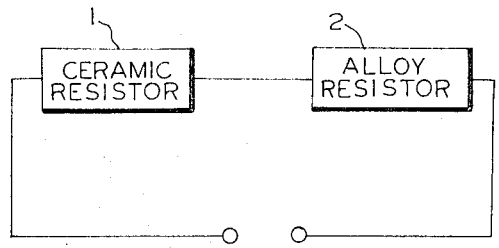
FIG. 1 is a simplified circuit diagram of the temperature-sensitive heating system used in the electrical rice cooker according to the present invention.
Figure 2:
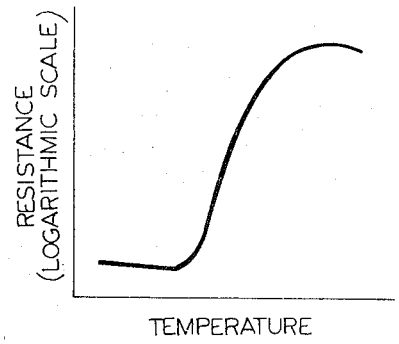
FIG. 2 is a graph of a typical characteristic behavior of resistor with a positive temperature coefficient of resistance.
Figure 3:
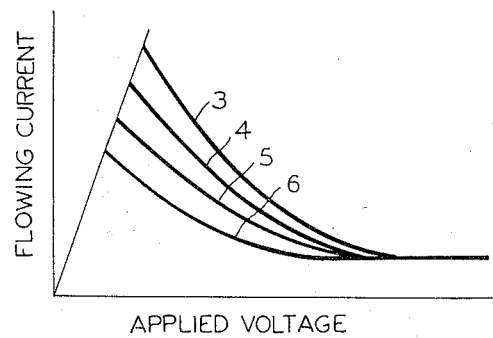
FIG. 3 is a graph of the current-voltage characteristic of a PTCR-resistor as a function of ambient temperature.

As shown in FIG. 1, the PTC ceramic resistor 1 and alloy resistor 2, such as a nickel-chromium alloy resistor, are connected in series in the present rice cooker. The PTC ceramic resistor has an unusual relationship between temperature and resistance as shown in FIG. 2. The PTC effect accordingly results in voltage-current curves 3, 4, 5 and 6 of FIG. 3 corresponding to ambient temperatures $T_3$, $T_4$, $T_5$ and $T_6$, where $T_3 < T_4, T_5 < T_6$. In the present rice cooker, the alloy resistor and the PTC resistor are electrically connected in series and they are thermally coupled through the materials to be heated, such as rice and water.

Figure 4:
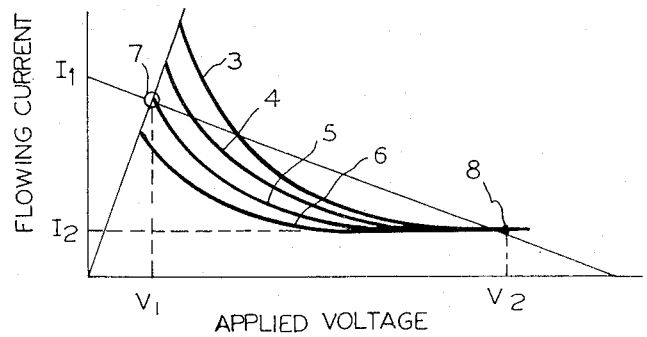
FIG. 4 is a graph showing the operating points of the electrical circuit of FIG. 1 as a function of ambient temperatures.

When the series circuit is connected to the current mains at the ambient temperature $T_1$, the PTC resistor has a V-I curve 3 as shown in FIG. 4 and is adjusted to operating point 7 where a larger current $I_1$ flows through the series circuit and the voltage drop V, across the PTC resistor, is very low compared with the supply voltage V. Therefore, a considerable amount of heat is developed in the alloy resistor. Since the both resistors are thermally coupled each other through the material being heated, the temperature of the PTC resistor gradually rises. When it goes over $T_3$ and reaches $T_4$, the I-V curve for the PTC resistor moves to 5 and 6 and the operating point 7 moves to the point 8 of FIG. 4, respectively. At the operating point 7, a considerable amount of heat energy develops in the alloy resistor 2 and is used for boiling the raw rice. On the other hand, at the operating point 8, the voltage drop across the PTC resistor 1 is substantially equal to the supply voltage V and the current flowing in the series circuit is reduced to a lower value $I_2$. Consequently, very little heating energy is produced, and that which is produced is produced mainly in the PTC resistor 1. The small amount of heat energy is used for keeping the cooked rice warm at an appropriate temperature.

Figure 5:
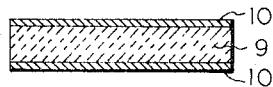
FIG. 5 is a cross-sectional view of the PTCR-resistor of the present invention.

The PTC resistor comprises a semiconductive barium titanate ceramic which exhibits an abrupt increase in electrical resistance above a certain temperature as shown in FIG. 2. The semiconductive barium titanate ceramic can be prepared by well-known ceramic techniques. For example, a mixture of barium carbonate, lead oxide, and titanium dioxide at an appropriate molar ratio forming a $(Ba, Pb)TiO_3$ composition upon completion of the reaction of these materials is wet mixed after having had added thereto 0.1 to 3.0 percent by weight aluminum oxide, 0.1 to 3.0 percent by weight silicon oxide, and 0.2 to 5.0 percent by weight titanium dioxide. The mixture calcined at an appropriate temperature is pressed into disc form and fired in air at about 1,350° C. for 2 hours. As shown in FIG. 5, two major surfaces of the sintered disc have electrodes applied thereto by electroless nickel-plating or molten metal-spraying methods for assuring an ohmic contact between the ceramic body 9 and the metal film 10.

Figure 6:
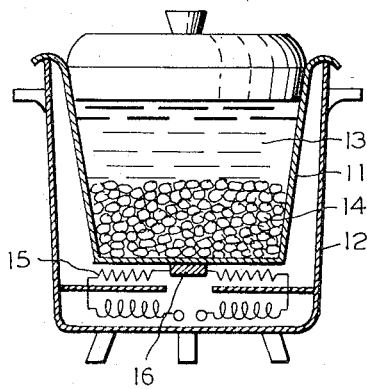
FIG. 6 is a cross-sectional view of the rice cooker according to the present invention.

Referring to FIG. 6, the present rice cooker can be taken apart into two parts similarly to the conventional electrical rice cooker for easy cleaning. The one part is a pot 11 for receiving water 13 and rice 14, and the other is a body 12 having a heater winding 15 and a PTC resistor 16 as a temperature controlling device. The pot 11 is thermally coupled, at the bottom thereof, to the alloy resistor 15 and PTC resistor 16.

Electrical energy is supplied to the rice cooker in which rice and water in an appropriate weight ratio are contained. The operating point of the series circuit is the intersection point 7 of FIG. 4. At the operating point 7, a considerable amount of heating energy in the alloy resistor and can be calculated as $I_1$ (V−V) in FIG. 4. Consequently, the temperature in the pot rises as shown in stage 17 of FIG. 7. The temperature in the pot is kept at about 100° C. as shown in stage 18 of FIG. 7 under a normal atmospheric pressure as long as water in a liquid state remains. When the water has boiled away or been absorbed by the rice, the temperature in the pot rises rapidly, as shown in stage 19 of FIG. 7. Under the influence of the temperature rise, the temperature of the PTC resistor also rises and the operation point moves to point 8 in FIG. 4. At the operating point 8, a less amount of heating energy is developed in the PTC resistor and can be calculated at $V_2 I_2$. On the other hand, a much smaller amount of heating energy is developed in the alloy resistor and can be calculated as $(V−V_2) I_2$. The decrease in heating energy lowers the temperature in the pot as shown in stage 20 of FIG. 7. This small heating energy is desirable for keeping the cooked rice warm without charing.

Figure 9:
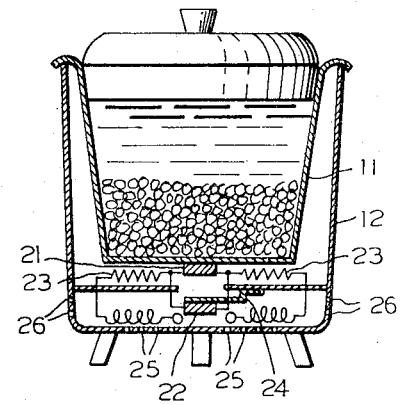
FIG. 9 is a cross-sectional view of the rice cooker with an improved circuit according to FIG. 8.
Figure 7:
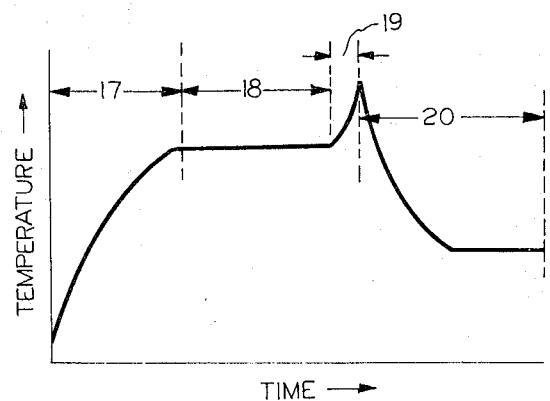
FIG. 7 is a graph of the working curve of rice cooker of the present invention.
Figure 8:
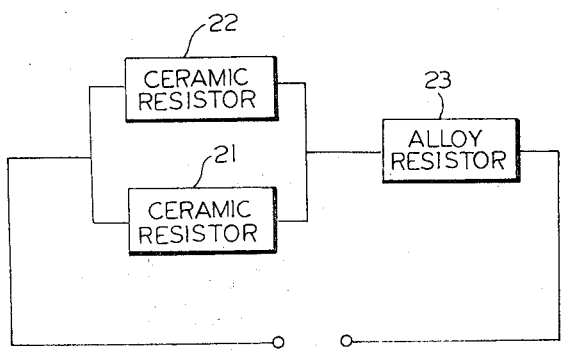
FIG. 8 is a circuit diagram of an improved heating system used in a rice cooker with a large cooking capacity.

When a larger amount of rice is cooked, a larger amount of heating energy is correspondingly required in the stages 17 and 18. The larger current makes the PTC resistor reach more quickly the critical temperature at which the resistance begins to increase. This quicker temperature rise, namely a shorter duration of the stage 18, is unfavorable for rice cooking. If the room temperature resistance of the PTC resistor is in inverse proportion to the square of flowing current, the quicker temperature rise can be prevented. Since a PTC resistor having a lower resistance at room temperature has a lower resistance in the PTCR region compared with a PTC resistor having a higher room-temperature resistance, the heating energy developed in the former resistor at the warming stage 20 of FIG. 7 is too large to warm the cooked rice properly. The large heating energy leads to a charing of the cooked rice. It has been discovered according to the invention that the quicker temperature rise and charing of the cooked rice can be prevented by using a heating circuit in which the PTC resistor is connected in parallel with another PTC resistor as shown in FIG. 8 where 21, 22 and 23 are respectively a first PTC resistor, a second PTC resistor, and an alloy resistor, respectively. In the rice cooker with the electrical circuit of FIG. 8, the PTC resistor 21 is in a close thermal coupling with the pot 11 and the PTC resistor 22, in a considerably less close thermal coupling with the pot 11. Referring to FIG. 9, the rice cooker according with the improved circuit has the first PTC resistor 21, the second PTC resistor 22, the alloy resistor 23, and a supporter 24 for the second resistor 22.

When the improved circuit of FIG. 8 is connected to a power source, the operating point is the point 7 of FIG. 4 so that a part of the flowing current $I_1$ is shunted by the second resistor 22. By shunting the current $I_1$, the quicker temperature rise above the critical temperature of the PTC resistor 21 can be prevented. In addition to this, heating energy developed at the operating point 8 is also divided into that produced by the two PTC resistors 21 and 22. Since the second PTC resistor 22 is less closely thermally coupled with the pot 11, the cooked rice can be protected from charing during the stage 20 of FIG. 7. A considerable part of the heating energy developed in the second PTC resistor 22 is dissipated by heat exchange due to an ascending airflow from ventilating holes 25 in the bottom of rice cooker to ventilating holes 26 in the lower side of the body 12.

Only a small part of the heating energy developed in the second resistor 22 passes through the supporter 24 to the pot. The small heating energy does not promote charing during the stage 20.

It will be understood by those skilled in the art that the apparatus according to the invention can be modified in various respects without departing from the essence of the invention and within the essential features of the invention as set forth in the claims annexed hereto.

We claim:

1. An electric rice cooker comprising a heat conductive pot for holding rice to be cooked, pot shaped body means for supporting said pot at the upper periphery thereof, and an electric heater circuit for quickly switching from a large current to a small current upon completion of cooking of the rice and being mounted in the space between the bottom of said pot and said body means, the small current being used for keeping the cooked rice warm, said heat circuit comprising an alloy resistor and at least one resistor having a positive temperature coefficient of electrical resistance in series with said alloy resistor, said positive temperature coefficient resistor being positioned immediately adjacent to the bottom surface of said pot and in thermal conductivity therewith.

2. An electric rice cooker as claimed in claim 1 in which the resistor having a positive temperature coefficient of electrical resistance is a semiconductive barium and lead titanate solid solution ceramic.

3. An electric rice cooker comprising a heat conductive pot for holding rice to be cooked, body means for supporting said pot, and a heater circuit mounted in said body means for quickly switching from a large current to a small current upon completion of cooking of the rice the small current being used for keeping the cooked rice warm, said heater circuit comprising an alloy resistor and two parallel-connected resistors having a positive temperature coefficient of electrical resistance connected in series with said alloy resistor, said body having means for positioning one of said two parallel-connected resistors adjacent said pot in a space between said pot and said body means to be thermally coupled to said pot and means for supporting the other of said two parallel-connected resistors spaced from said pot to be considerably less thermally coupled therewith than said one resistor.

4. An electric rice cooker as claimed in claim 3 in which said body means has small holes in its bottom and its lower side, whereby the heating energy developed in the other of said two resistors is dissipated by heat exchange due to an ascending air flow from the holes in the bottom to the holes at the lower side of said body means.